(12) United States Patent
Hwang et al.

(10) Patent No.: US 10,231,220 B2
(45) Date of Patent: Mar. 12, 2019

(54) PUCCH TRANSMISSION METHOD BY MTC DEVICE

(71) Applicant: LG ELECTRONICS INC., Seoul (KR)

(72) Inventors: Daesung Hwang, Seoul (KR); Yunjung Yi, Seoul (KR); Suckchel Yang, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/521,605

(22) PCT Filed: Oct. 21, 2015

(86) PCT No.: PCT/KR2015/011136
§ 371 (c)(1),
(2) Date: Apr. 24, 2017

(87) PCT Pub. No.: WO2016/068542
PCT Pub. Date: May 6, 2016

(65) Prior Publication Data
US 2017/0245265 A1    Aug. 24, 2017

Related U.S. Application Data

(60) Provisional application No. 62/164,005, filed on May 20, 2015, provisional application No. 62/148,744, (Continued)

(51) Int. Cl.
*H04W 72/04* (2009.01)
*H04L 5/00* (2006.01)
(Continued)

(52) U.S. Cl.
CPC .......... *H04W 72/0413* (2013.01); *H04L 5/00* (2013.01); *H04L 5/0055* (2013.01);
(Continued)

(58) Field of Classification Search
None
See application file for complete search history.

(56) References Cited

U.S. PATENT DOCUMENTS 9,860,030 B2 *  1/2018  Papasakellariou .... H04W 48/12
9,929,902 B2 *  3/2018  Blankenship ........ H04B 7/0632
(Continued)

FOREIGN PATENT DOCUMENTS

| JP | 2012506671 | 3/2012 |
|---|---|---|
| WO | 2010048142 | 4/2010 |
| WO | 2014020819 | 2/2014 |

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 10)," 3GPP TS 36.211 V10.4.0, Dec. 2011, 101 pages.
(Continued)

*Primary Examiner* — Michael J Moore, Jr.
(74) *Attorney, Agent, or Firm* — Lee Hong Degerman Kang Waimey

(57) ABSTRACT

Disclosed is a method for transmitting a physical uplink control channel (PUCCH) by a machine type communication (MTC) device. The PUCCH transmission method comprises the steps of: receiving configuration for independent PUCCH resources at each repetition level of PUCCH; determining a PUCCH resource corresponding to a repetition level, on the basis of the configuration; and repeatedly transmitting the PUCCH, on the determined resource.

13 Claims, 15 Drawing Sheets

Related U.S. Application Data filed on Apr. 17, 2015, provisional application No. 62/107,519, filed on Jan. 26, 2015, provisional application No. 62/072,445, filed on Oct. 30, 2014.

(51) Int. Cl.
*H04W 4/70* (2018.01)
*H04L 27/26* (2006.01)
*H04L 29/08* (2006.01)

(52) U.S. Cl.
CPC ........ *H04L 27/2601* (2013.01); *H04L 69/324* (2013.01); *H04W 4/70* (2018.02); *H04W 72/0446* (2013.01)

(56) References Cited

U.S. PATENT DOCUMENTS

| | | | |
|---|---|---|---|
| 2010/0098012 | A1 | 4/2010 | Bala et al. |
| 2014/0098761 | A1 | 4/2014 | Lee et al. |
| 2014/0119331 | A1 | 5/2014 | Ji et al. |
| 2017/0033843 | A1* | 2/2017 | Wang ............... H04W 4/70 |
| 2017/0163391 | A1* | 6/2017 | Kimura ............ H04W 16/14 |
| 2017/0164250 | A1* | 6/2017 | Kim ................. H04W 4/70 |
| 2017/0164335 | A1* | 6/2017 | Yamamoto ....... H04L 5/0053 |
| 2017/0164350 | A1* | 6/2017 | Sun ............... H04W 72/0413 |
| 2017/0214495 | A1* | 7/2017 | Golitschek Edler von Elbwart ........... H04L 1/1861 |
| 2017/0280481 | A1* | 9/2017 | Stern-Berkowitz ................. H04W 74/008 |
| 2018/0069593 | A1* | 3/2018 | Yi .................. H04W 4/70 |
| 2018/0076924 | A1* | 3/2018 | Lee ................ H04L 1/0026 |
| 2018/0146438 | A1* | 5/2018 | Yi .................. H04W 52/267 |

OTHER PUBLICATIONS

CATT, "PUCCH coverage improvement details for MTC UEs," 3GPP TSG-RAN WG1 #76, R1-140078, Feb. 2014, 4 pages.
Sharp, "Discussion on PUCCH for MTC UEs in coverage enhanced mode," 3GPP TSG-RAN WG1 #76, R1-140641, Feb. 2014, 5 pages.
ZTE, "Discussion on PUCCH Coverage Improvement," 3GPP TSG-RAN WG1 #76, R1-140275, Feb. 2014, 6 pages.
PCT International Application No. PCT/KR2015/011136, Written Opinion of the International Searching Authority dated Mar. 31, 2016, 6 pages.
Japan Patent Office Application No. 2017-513405, Office Action dated Jan. 29, 2018, 5 pages.
SAMSUNG, "Transmission of UL Control Channels for Rel-13 Low Cost UEs", 3GPP TSG RAN WG1 Meeting #80, R1-150350, Feb. 2015, 4 pages.
ZTE, "Discussion on physical uplink control channel for MTC enhancement", 3GPP TSG RAN WG1 Meeting #80, R1-150144, Feb. 2015, 4 pages.
European Patent Office Application Serial No. 15855006.1, Search Report dated May 2, 2018, 8 pages.
LG Electronics, "UL channel transmission for MTC coverage enhancement", 3GPP TSG RAN WG1 Meeting #76, R1-140308, Feb. 2014, 5 pages.
Japan Patent Office Application No. 2017-513405, Office Action dated Sep. 18, 2018, 4 pages.

* cited by examiner

PUCCH TRANSMISSION METHOD BY MTC DEVICE

CROSS-REFERENCE TO RELATED APPLICATIONS

This application is the National Stage filing under 35 U.S.C. 371 of International Application No. PCT/KR2015/011136, filed on Oct. 21, 2015, which claims the benefit of U.S. Provisional Application No. 62/072,445, filed on Oct. 30, 2014, 62/107,519, filed on Jan. 26, 2015, 62/148,744, filed on Apr. 17, 2015, and 62/164,005, filed on May 20, 2015, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC devices, wide service areas, low traffic for each MTC device, etc.

As one of methods of lowering cost per unit of MTC device, the MTC device may only use a limited region, i.e. only a subband, regardless of a system bandwidth of a cell.

The PUCCH among the uplink channels is expected to be transmitted at both ends based on the entire uplink system bandwidth of the cell. Therefore, according to the existing technology, the MTC device can not transmit the PUCCH on any one of the subbands.

SUMMARY OF THE INVENTION

Accordingly, the disclosure of the specification has been made in an effort to solve the problem.

To achieve the foregoing purposes, the disclosure of the present invention proposes methods of capable of transmitting the PUCCH in a sub-band in which the MTC operates.

In more detail, the present disclosure provides a method for transmitting a physical uplink control channel (PUCCH). The method may be performed by a machine type communication (MTC) device and comprise: receiving a configuration for a PUCCH resource, which is independent per a repetition level of the PUCCH; determining a corresponding PUCCH resource based on the configuration; and transmitting repetitions of the PUCCH on the determined resource.

The method may further comprise: determining the number of the repeated transmission of the PUCCH according to the repetition level.

The repeated transmission of the PUCCH may be performed if the MTC device is located in coverage enhancement region of a cell.

The configuration for the PUCCH resource may include cell-specific values.

Meanwhile, the present disclosure also provides a method for transmitting a physical uplink control channel (PUCCH). The method may be performed by a machine type communication (MTC) device. The method may comprise: transmitting repetitions of the PUCCH on a plurality of subframes; and performing a frequency hopping for the PUCCH during transmitting the repetitions of the PUCCH. Here, a location of a frequency region on which the PUCCH is transmitted may be maintained during n subframes among the plurality of subframes.

The location of the frequency region on which the PUCCH is transmitted may not be hopped in a unit of a slot.

The location of the frequency region on which the PUCCH is transmitted may be located on a subband within an uplink system bandwidth.

The frequency hopping may be performed within the subband.

The frequency hopping may be performed in a unit of the subband.

According to the disclosure of the present specification, the problems of the above-described prior art are solved.

In specific, according to the present disclosure, an MTC device operating on some subbands, rather than the entire system band, may effectively configure the PUCCH region, thereby increasing flexibility in PUSCH RB allocation for a legacy general UE and other MTC devices.

DESCRIPTION OF EXEMPLARY EMBODIMENTS

Figure 1:
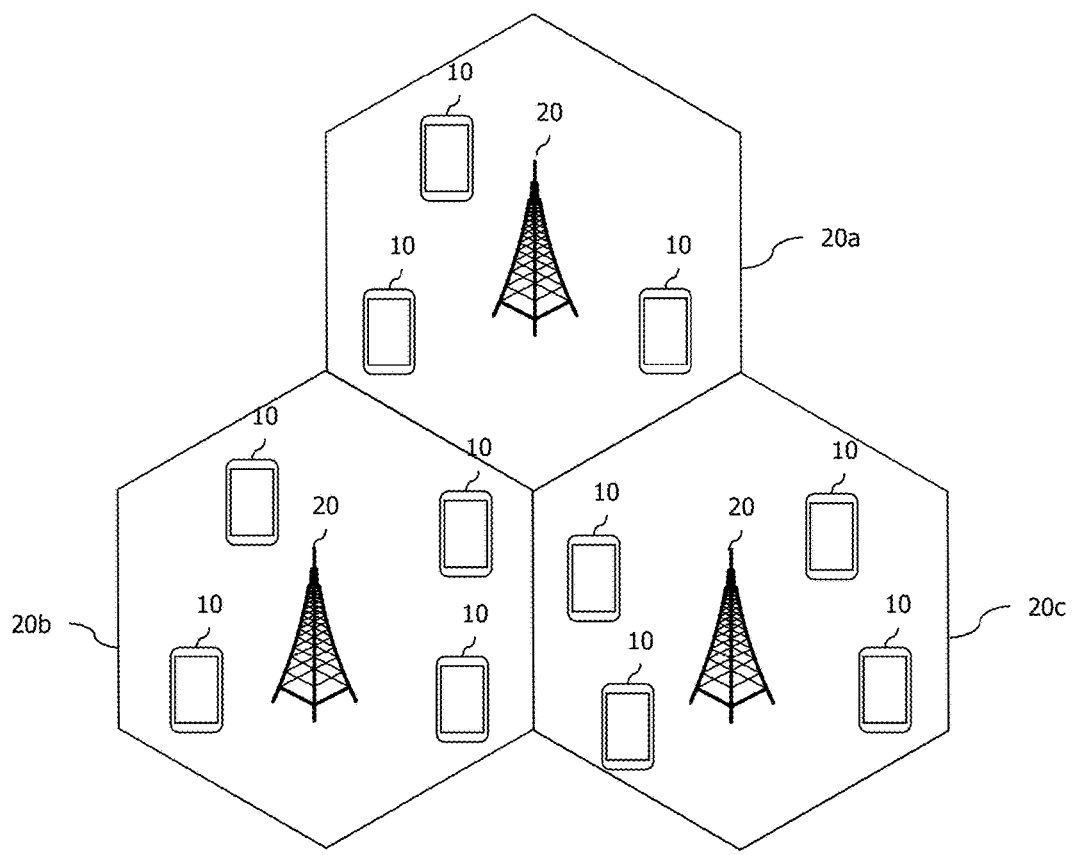
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
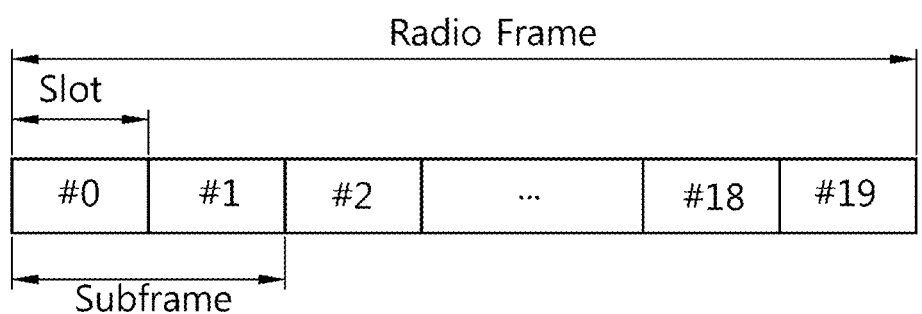
FIG. 2 illustrates the architecture of a radio frame according to frequency division duplex (FDD) of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
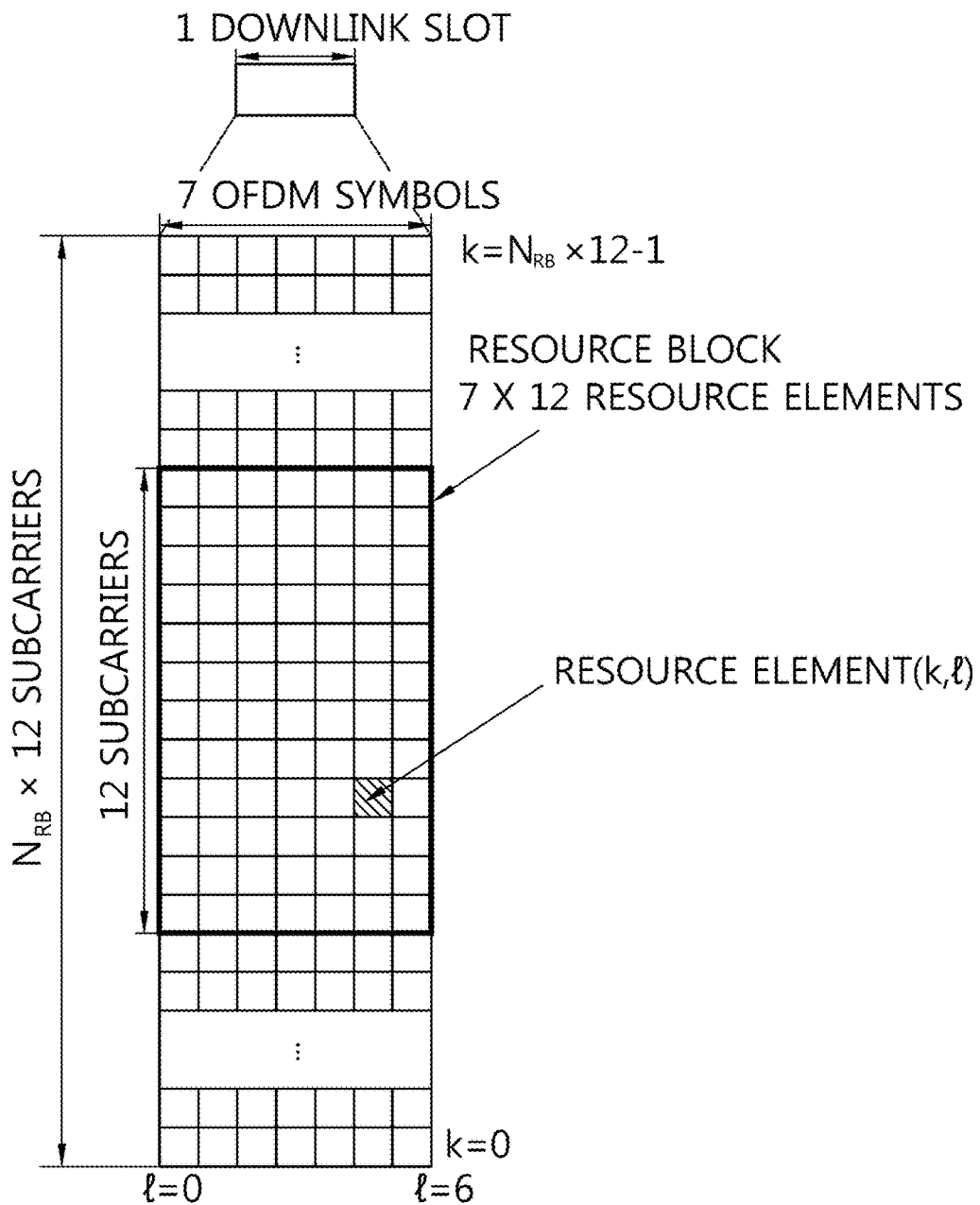
FIG. 3 illustrates the architecture of a downlink radio frame according to time division duplex (TDD) in 3GPP LTE.

FIG. 3 Illustrates an Example Resource Grid for One Uplink or Downlink Slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
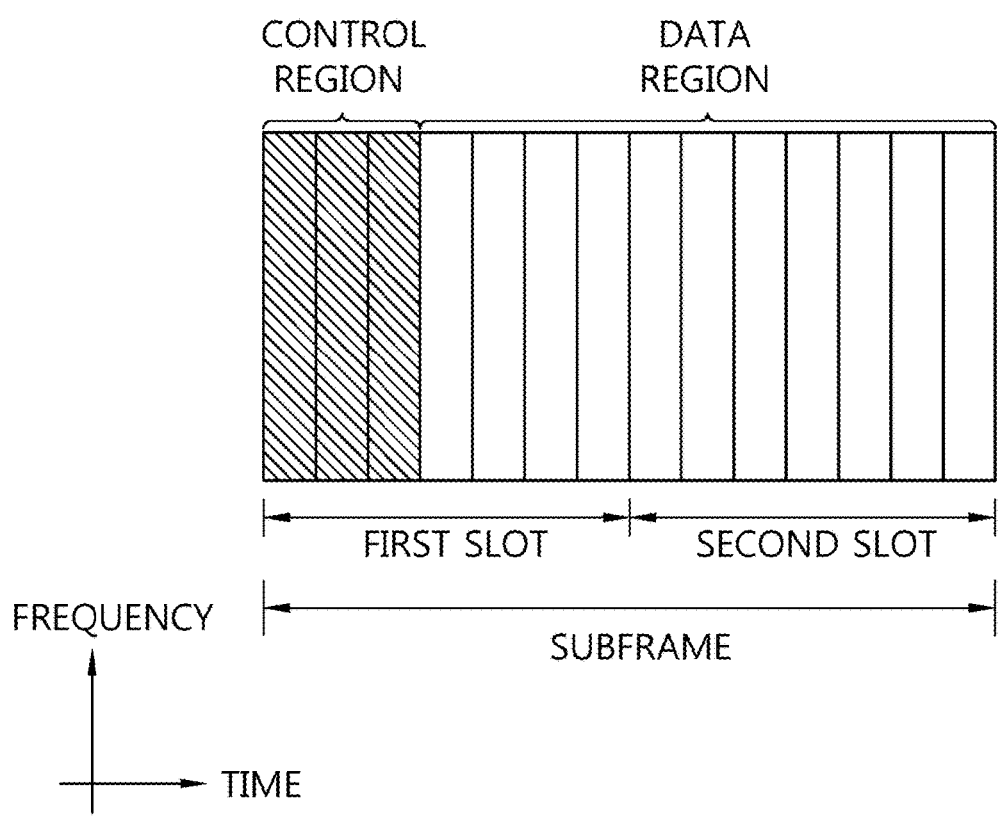
FIG. 4 illustrates an example resource grid for one uplink or downlink slot in 3GPP LTE.

FIG. 4 Illustrates the Architecture of a Downlink Sub-Frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 5:
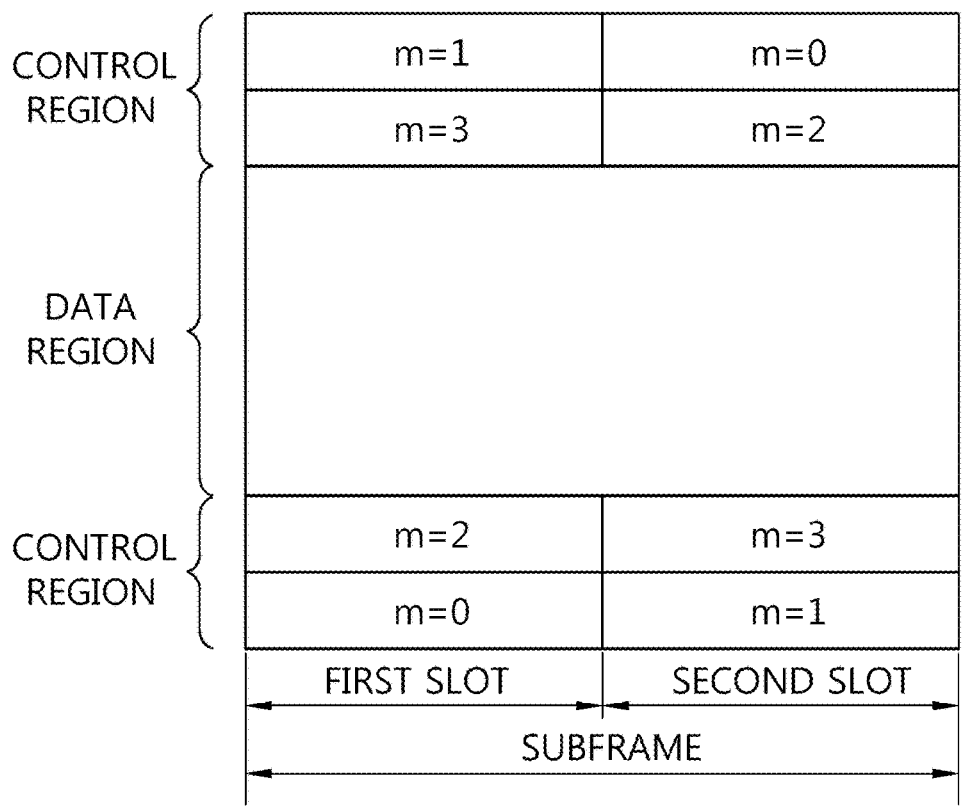
FIG. 5 illustrates the architecture of a downlink subframe.

FIG. 5 Illustrates the Architecture of an Uplink Sub-Frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 6:
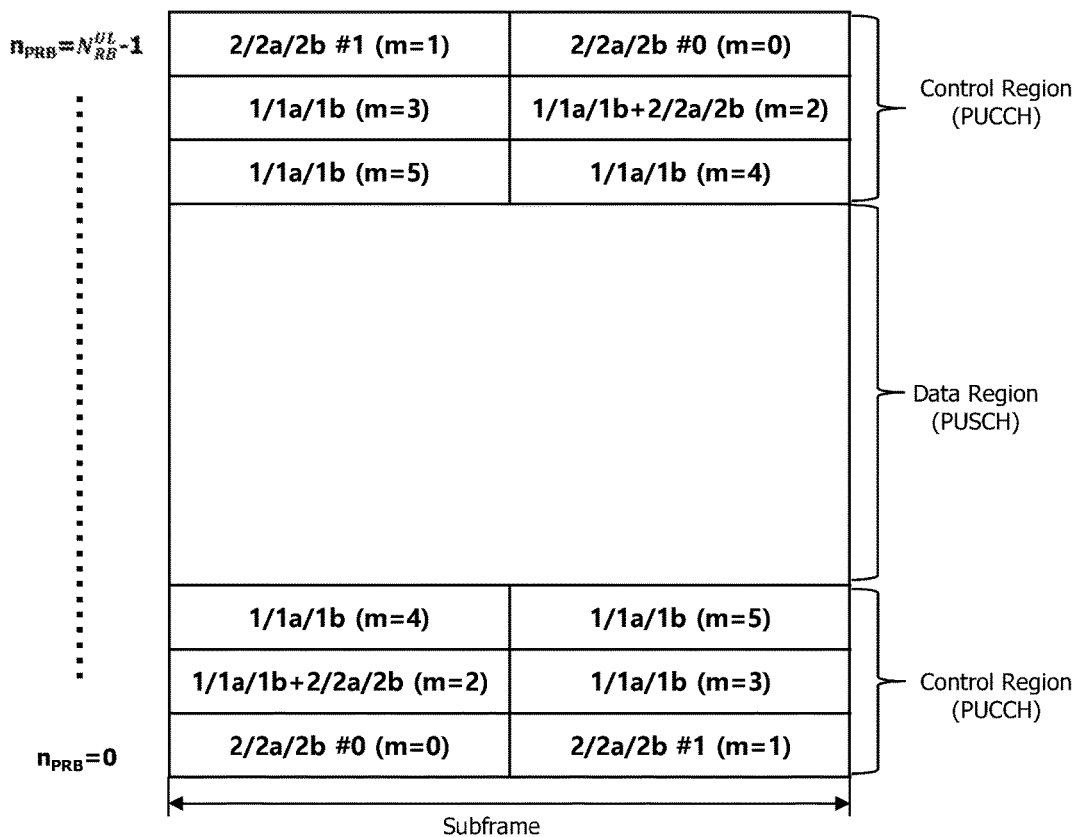
FIG. 6 is an exemplary diagram illustrating a transmission region based on the PUCCH formation.

FIG. 6 Illustrates the PUCCH and the PUSCH on an Uplink Subframe.

PUCCH formats will be described with reference to FIG. 6.

The PUCCH format 1 carries the scheduling request (SR). In this case, an on-off keying (OOK) mode may be applied. The PUCCH format 1a carries acknowledgement/non-acknowledgement (ACK/NACK) modulated in a binary phase shift keying (BPSK) mode with respect to one codeword. The PUCCH format 1b carries ACK/NACK modulated in a quadrature phase shift keying (QPSK) mode with respect to two codewords. The PUCCH format 2 carries a channel quality indicator (CQI) modulated in the QPSK mode. The PUCCH formats 2a and 2b carry the CQI and the ACK/NACK.

A table given below carries the PUCCH formats.

TABLE 1

| Format | Modulation mode | Total bit count per subframe | Description |
| --- | --- | --- | --- |
| Format 1 | Undecided | Undecided | Scheduling request (SR) |
| Format 1a | BPSK | 1 | ACK/NACK of 1-bit HARQ, scheduling request (SR) may be present or not present |
| Format 1b | QPSK | 2 | ACK/NACK of 2-bit HARQ, scheduling request (SR) may be present or not present |
| Format 2 | QPSK | 20 | In case of extended CP, CSI and 1-bit or 2-bit HARQ ACK/NACK |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | Multiple ACKs/NACKs, CSI, and scheduling request (SR) may be present or not present |

Each PUCCH format is transmitted while being mapped to a PUCCH region. For example, the PUCCH format 2/2a/2b is transmitted while being mapped to resource blocks (m=0 and 1) of band edges assigned to the UE. A mixed PUCCH RB may be transmitted while being mapped to a resource block (e.g., m=2) adjacent to the resource block to which the PUCCH format 2/2a/2b is assigned in a central direction of the band. The PUCCH format 1/1a/1b in which the SR and the ACK/NACK are transmitted may be disposed in a resource block in which m=4 or m=5. The number (N(2)RB) of resource blocks which may be used in the PUCCH format 2/2a/2b in which the CQI is transmitted may be indicated to the UE through a broadcasted signal.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

<EPDCCH (Enhanced Physical Downlink Control Channel)>

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. Further, in order to decrease an overhead caused by CRS transmission, an enhanced PDCCH (EPDCCH) has been introduced.

Figure 7:
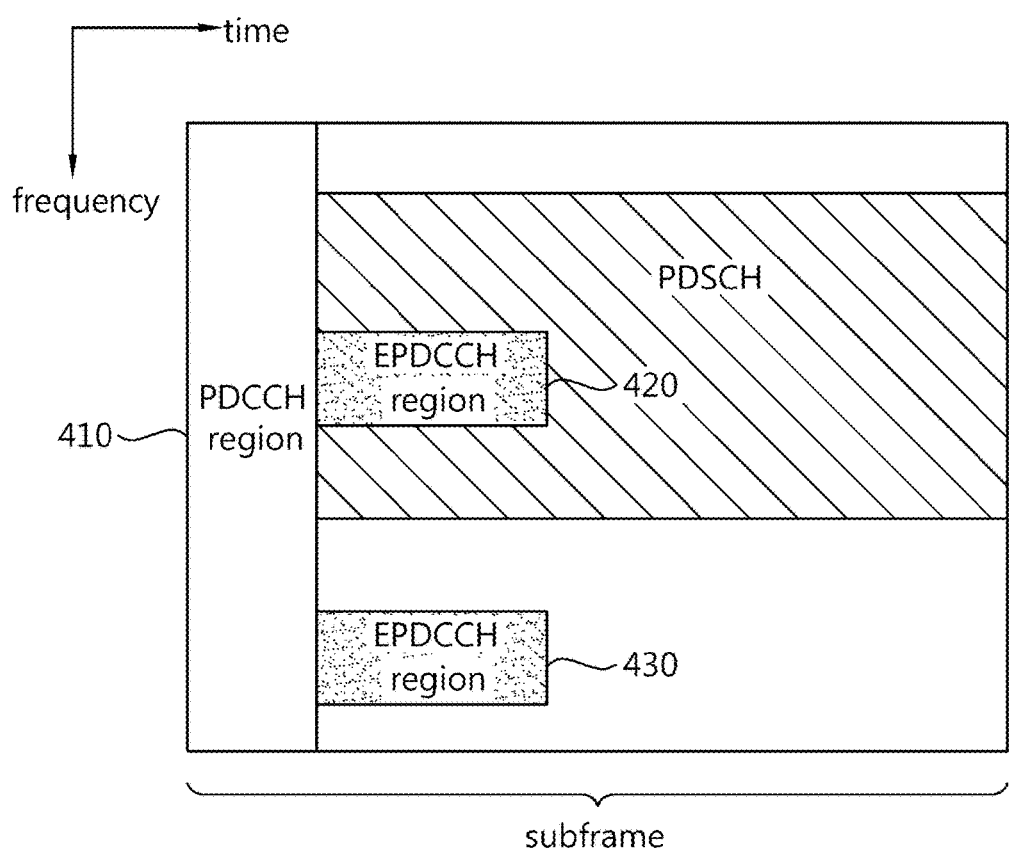
FIG. 7 is an example of a subframe having an EPDCCH.

FIG. 7 is an Example of a Subframe Having an EPDCCH.

A subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

In below, an EPDCCH search space may correspond to an EPDCCH region. One or more EPDCCH candidates may be monitored at one or more aggregation levels in the EPDCCH search space.

<MTC (Machine Type Communication) Communication>

Hereinafter, MTC will be described.

Figure 8A:
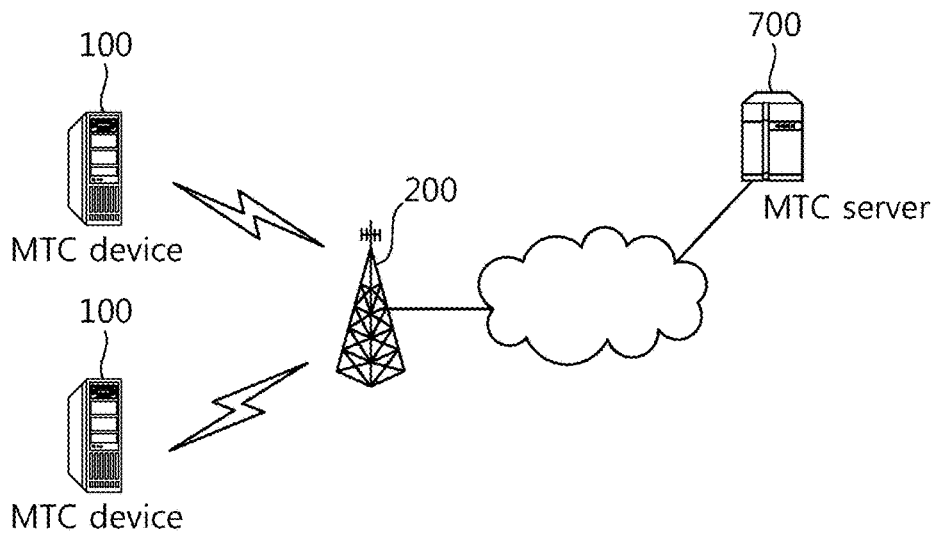
FIG. 8A illustrates an example of Machine Type Communication (MTC).

FIG. 8a Illustrates an Example of Machine Type Communication (MTC).

The MTC refers to information exchange performed between MTC devices 100 via a BS 200 without human interactions or information exchange performed between the MTC device 100 and an MTC server 700 via the BS.

The MTC server 700 is an entity for communicating with the MTC device 100. The MTC server 700 executes an MTC application, and provides an MTC-specific service to the MTC device.

The MTC server 700 is an entity for communicating with the MTC device 100. The MTC server 700 executes an MTC application, and provides an MTC-specific service to the MTC device.

A service provided using the MTC is differentiated from an existing communication service requiring human intervention, and its service range is various, such as tracking, metering, payment, medical field services, remote controlling, or the like. More specifically, examples of the service provided using the MTC may include reading a meter, measuring a water level, utilizing a surveillance camera, inventory reporting of a vending machine, or the like.

The MTC device is characterized in that a transmission data amount is small and uplink/downlink data transmission/reception occurs sometimes and therefore, it is effective to decrease a unit cost of the MTC device and to decrease battery consumption according to a low data transmission rate. The MTC device is characterized of having a small mobility, and thus is characterized in that a channel environment does almost not change.

Figure 8B:
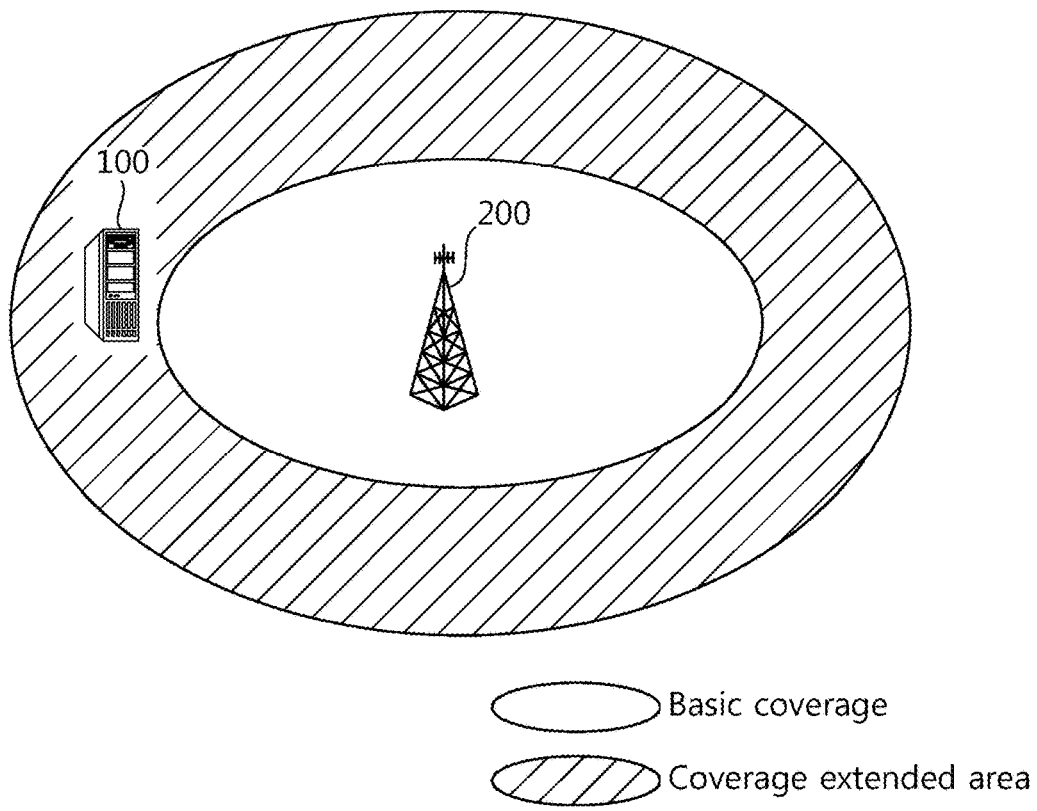
FIG. 8B illustrates an example of Cell Coverage Extension for an MTC Device.

FIG. 8b Illustrates an Example of Cell Coverage Extension for an MTC Device.

Recently, it has been considered to extend cell coverage of a BS (base station) for an MTC device 100, and various schemes for extending the cell coverage have been under discussion.

However, when the cell coverage is extended, if the MTC device located in the coverage extension region transmits an uplink channel, then the BS has a difficulty in receiving the uplink channel.

Figure 8C:
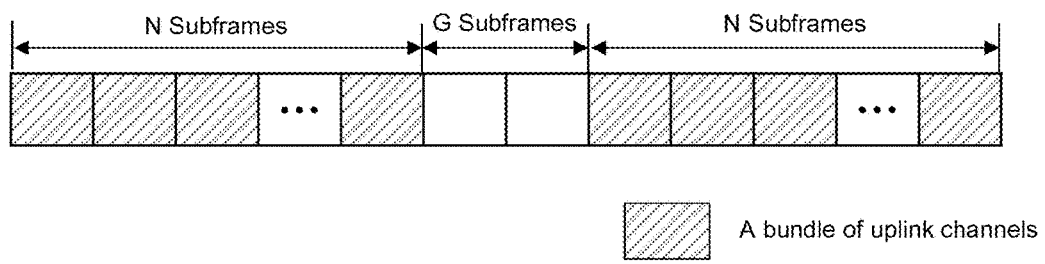
FIG. 8c is an exemplary diagram illustrating an example of transmitting a bundle of the uplink channels.

FIG. 8c is an Exemplary Diagram Illustrating an Example of Transmitting a Bundle of the Uplink Channels.

As it may be seen with reference to FIG. 8c, the MTC device which is located in the coverage extension area 100 repeatedly transmits multiple subframes (e.g., N sub-frames) on the uplink channel (e.g., PUCCH and/or PUSCH). As described in the above, the uplink channel that is repeated on the multiple sub-frames is referred to as the bundle of the uplink channel.

Meanwhile, the BS receives the bundle of the uplink channel on the multiple sub-frames, and decodes a portion or the whole of the bundle, and thus it is possible to increase the success rate of decoding.

Meanwhile, the BS may also transmit a bundle of downlink channels (e.g., PDCCH and/or PDSCH) to the MTC device located in the coverage extension area on multiple subframes.

Figure 9:
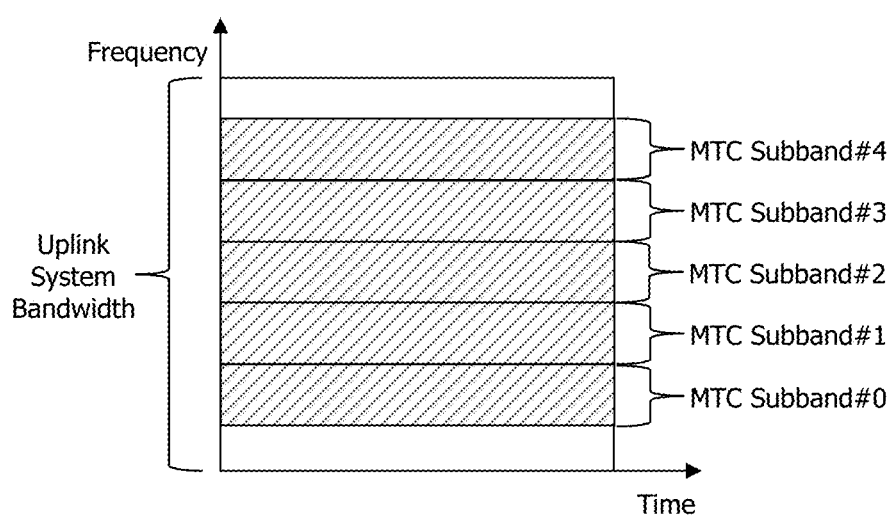
FIG. 9 is an exemplary diagram of illustrating an example in which the MTC device uses only a portion of subband of the downlink system bandwidth of the cell.

FIG. 9 is an Exemplary Diagram of Illustrating an Example in which the MTC Device Uses Only a Portion of Subband of the Downlink System Bandwidth of the Cell.

As one of methods of lowering cost of the MTC device, the downlink system bandwidth of the cell is divided into several subbands of a certain size unit (e.g. 1.4 MHz unit or several RB unit), and the MTC device may receive the downlink channel in only one of the several subbands, as illustrated in FIG. 9.

Similarly, the uplink system bandwidth of the cell may be divided into several subbands of a certain size, and the MTC device may transmit the uplink channel in any one of the subbands.

Meanwhile, the PUCCH among the uplink channels is transmitted at both ends based on the entire uplink system bandwidth of the cell. Therefore, according to the existing technology, there is a problem that the MTC device can not transmit the PUCCH on any subband of the uplink system bandwidth of the cell.

DISCLOSURE OF THE PRESENT INVENTION

Accordingly, the disclosure of the present specification has purposes of providing a method to solve the above mentioned problem.

In brief, disclosure of the present specification describes a method for mapping and transmitting the uplink channel to allow an MTC device to transmit an uplink channel on a portion of the uplink band (i.e., a subband), rather than the entire uplink system band of the cell.

In other words, the disclosure of the present specification describes a method for configuring the PUCCH region and mapping the PUCCH to a resource when the MTC device transmits PUCCH on a portion of the uplink band (i.e., subband), rather than the entire uplink system band of the cell. In this case, a plurality of subbands may be allocated to one MTC device, and the MTC device may select any one of the plurality of subbands according to the situation. The size of the subband may be the same for all MTC devices in the cell. The downlink subband and the uplink subband may be respectively configured to the MTC device, respectively. For example, the MTC device 1 may be allocated to the uplink subband 1 and the downlink subband 2, and the MTC device 2 may be allocated to the uplink subband 2 and the downlink subband 2. Alternatively, a plurality of MTC devices may be allocated to the same downlink subbands, and uplink subbands may be allocated differently.

Meanwhile, in below, the mapping of the PUCCH is described as being performed in PRB units. However, when considering frequency hopping or uplink/downlink subband-based hopping, the PRB may be re-interpreted as a virtual RB (VRB). In this case, the VRB may be mapped to the PRB through a series of processes.

Hereinafter, the disclosure of the present specification will be described separately in each section.

I. PUCCH Region Configuration

PUCCH format 1/format 2 are transmitted to be mapped from RBs corresponding to both ends of the uplink system bandwidth. In the PUCCH format 3 series, the PRB position is determined based on the value configured in the RRC stage. Further, the hopping in a unit of slot is applied to the PUCCH, and the PRB positions transmitted in the even-numbered slot and the odd-numbered slot may be different. More specifically, the PUCCH is mapped symmetrically with respect to the system bandwidth (e.g., if the PUCCH is mapped to PRB 0 in the even slot, then it is mapped to the PRB corresponding to the system bandwidth-1 in the odd number). That is, the PUCCH region (except for PUCCH Format 3) is designed to maximize the contiguous RB allocation of the PUSCH. When the MTC device is allocated to a portion of subbands (e.g., six RBs) rather than the entire uplink system band as an effective operating band, there is a restriction in allocating the PUSCH of the general UE to the contiguous RBs, if the PUCCH region of the MTC device is allocated at both ends of the subbands. Further, there may be a restriction in allocating PUSCHs, to contiguous RBs, of other MTC devices, to which are allocated subbands at positions different from the positions of the subbands to which the MTC device is allocated. This will be described with reference to the drawings.

Figure 10A:
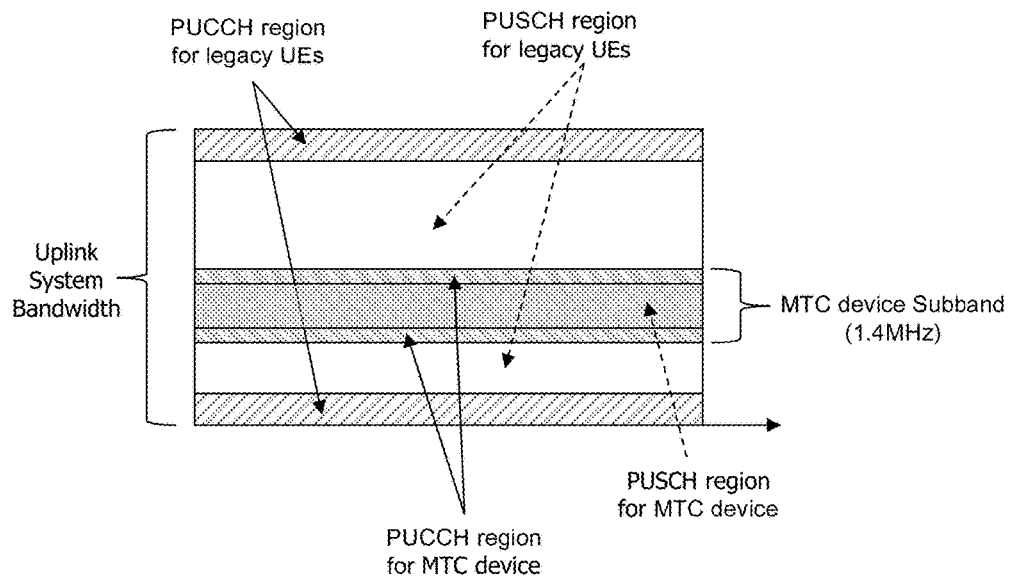
FIG. 10A illustrates an example of allocating PUCCHs for an MTC device to both ends of the subband, rather than to both ends of the system band.

FIG. 10A Illustrates an Example of Allocating PUCCHs for an MTC Device to Both Ends of the Subband, Rather than to Both Ends of the System Band.

As may be seen with reference to FIG. 10A, a legacy UE does not receive the PUSCH in a consecutive RB due to the subband allocated to the MTC device.

Further, as may be seen with reference to FIG. 10A, when the PUCCH region of the MTC device is located at both ends of the subband, rather than at both ends of the uplink system band, the legacy UE is also difficult to use the PUSCH region of the subband of the MTC device.

Though the UE is able to transmit PUSCH on non-contiguously allocated RBs, there may be a restriction on the use of RBG included in the subband of the MTC device according to the RBG configured based on the system bandwidth.

The above mentioned problem may be further aggravated when a plurality of MTC subbands are configured in the cell's uplink system band.

In order to solve the above mentioned problem, the problem may be avoided or mitigated by redesigning the PUCCH region configuration for the MTC device. Conventionally, the reason why the PUCCH region is placed at both ends of the system band is to perform a frequency hopping in a unit of slot in the PUCCH transmission. Conventionally, PUCCH is transmitted using a pair of RBs of which one is at one end of the system bandwidth in one slot and the other is at the other end of the system bandwidth in a different slot, diversity effect may be expected to be obtained in PUCCH transmission through the hopping in a unit of slot. However, in terms of cost reduction, MTC devices using only some subbands other than the entire system band are expected to be installed in a fixed place, and further since the MTC device operates only in some subbands other than the entire system band, and thus it is expected that the effect of slot hopping will not be substantial. Therefore, when the MTC device operates only in some subbands other than the entire system band, it is possible not to perform the frequency hopping in a unit of slot in the PUCCH transmission. Further in this case, it is also possible to consider that the PUCCH region is positioned at one end of the system bandwidth, rather than at both ends of the system bandwidth. In this case, the problem may be somewhat alleviated in that the PUSCH of the legacy UE may not be allocated to the contiguous RBs.

Figure 10B:
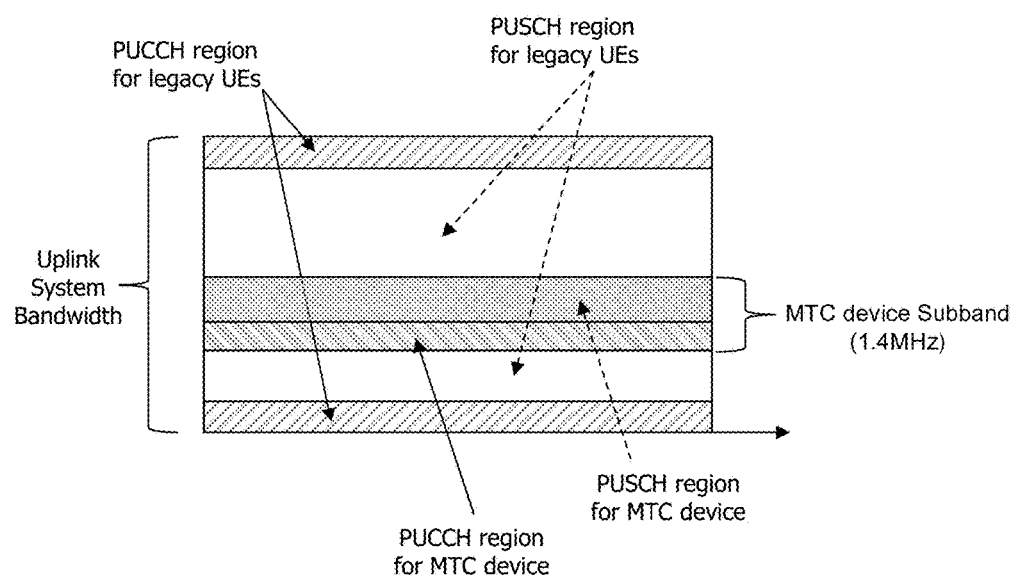
FIG. 10B illustrates an example of allocating a PUCCH for an MTC device at either end of a subband, rather than at both ends of the system band.

FIG. 10B Shows an Example of Allocating a PUCCH for an MTC Device at Either End of a Subband, Rather than at Both Ends of the System Band.

As may be seen with reference to FIG. 10B, when the PUCCH region of the MTC device is positioned at one end of a subband, rather than at both ends of the uplink system band, it is easier to allocate the PUSCH of the legacy UE to the contiguous RBs.

In specific, since the PUSCH region of the legacy UE is attached to the PUSCH region for the MTC device, the PUSCH region for the MTC device may also be utilized by the legacy UE.

Hereinafter, a detailed scheme for allocating (or configured) the PUCCH area for the MTC device will be described.

As a first alternative, the PUCCH region for an MTC device using only some subbands other than the entire system band may be allocated/configured via a higher layer signal. The allocation/configuration via the higher layer signaling may be performed by arranging a PUCCH region for the MTC device at both ends of the uplink system bandwidth, arranging the PUCCH region only at a position above the uplink system bandwidth, or arranging the PUCCH region only at a position below the uplink system bandwidth. Further, it is possible to configure the configuration of whether to frequency-hop the PUCCH in the slot unit to the MTC device through the higher layer signal. However, the frequency hopping in a unit of slot may be possible only when a PUCCH region for the MTC device is located at both ends of the uplink system bandwidth. When the PUCCH region is located at both ends of the uplink system bandwidth, it may be assumed that the MTC device may perform the frequency hopping in a unit of slot even without an additional signaling. However, when the PUCCH region is located only at one end of the uplink system bandwidth, it may be assumed that the MTC device does not perform the frequency hopping in a unit of slot even without an additional signaling.

As a second alternative, the PUCCH region for an MTC device using only some subbands, but not the entire system band, may be placed only at one end of the subband. In this case, when the center RE of the subband or RE in one of the ends for the MTC device is located above the middle of the uplink system band, the PUCCH region for the MTC device may be located a region corresponding to the upper side of the uplink system bandwidth. Alternatively, if the center RE of the subband or RE in one of the ends for the MTC device is located below the center of the uplink system bandwidth, the PUCCH region for the MTC device may be located a region corresponding to the lower side of the bandwidth of the MTC uplink system.

As a third alternative, a PUCCH region for an MTC device using only a portion of subbands other than the entire system band may be configured to be disposed only at one end of the uplink system bandwidth. In this case, if the center RE of the sub-band or one of the ends RE for the MTC device is positioned above the center RE or RE boundary of the RBG to which the uplink system bandwidth belongs, the PUCCH region for the MTC device may be located a region corresponding to the upper side of the system bandwidth. Alternatively, if the center RE of the subband or one of the ends RE for the MTC device is located below the center RE or the RE boundary of the RBG to which the uplink system bandwidth belongs, the PUCCH region for the MTC device may be located a region corresponding to the lower side of the system bandwidth. If the subband of the MTC device spans over a plurality of RBGs, the PUCCH region is configured in the same manner based on the RBG of which a greater portion is spanned over. When the same number of RBs is overlapped with a plurality of RBGs, it may be considered to configure the PUCCH region based on a small RBG index.

Through the above mentioned alternative, the flexibility of the PUSCH RB allocation of the legacy UE or other MTC UEs not corresponding to the MTC UL BW may be increased. As an alternative of configuring the PUCCH region in the MTC UL BW, a deployment for the middle RB region may be additionally considered in addition to both ends of the UL BW. As a specific example for a method of signaling to high layer in the above, a plurality of candidates for the MTC UL band (or subband) and/or the PRB region to which the PUCCH (or HARQ-ACK) is transmitted in the RRC layer may be designated, and then it may be indicate the subband and/or PRB combination to finally transmit the PUCCH (or HARQ-ACK) through the DCI. In this case, the DCI may correspond to a DL assignment, and the indication information on the candidate configured in the RRC layer in the DCI may be newly added in an ARI (AN resource indicator) manner or reused with the TPC field. Reuse of the TPC field in the above case is possible only when the MTC UE does not perform closed-loop power control using TPC.

As another alternative, it is possible to consider designating the PRB start position and/or the end position to which the PUCCH (or HARQ-ACK) is transmitted through the high layer in an offset form. A more specific example of an offset is that some bits may express whether the offset is based on the start or the end the system bandwidth or subband of MTC device, and the other bits may refer to the offset value to be applied. Meanwhile, if the number of repetitions of the PUCCH is determined based on a repetition level (or a CE level), then the BS may configure by signaling the offset to the MTC device independently for each repetition level (or CE level). The repetition level (or CE level) may also include the case that the repetition is not performed. For example, if the repetition level (or CE level) is zero, the repetition of the PUCCH may not be performed. Further, if the repetition level (or CE level) is 1, it means that the PUCCH is repeated one time, and thus the same PUCCH is finally transmitted on two subframes. If the repetition level (or CE level) is 2, it may mean that the same PUCCH is repeatedly transmitted on four subframes.

Meanwhile, when the PUCCH region is configured to be the same for each slot, it may be interpreted that the MTC device does not perform the frequency hopping in a unit of slot in the PUCCH transmission, and in this case, the MTC device may consider that the PUCCH region is allocated to the same RB for each slot. Alternatively, if the PUCCH area includes a plurality of contiguous RBs, then the MTC device may consider the hopping in a unit of slot among the plurality of RBs.

Meanwhile, the PUCCH region or the subband of MTC device may be configured so that the MTC device can be operated only on a specific subframe or subframe region. The MTC device may not transmit all or a part of the uplink physical channel such as the PUCCH on the sub-frame in which the transmission is not allowed or the sub-band or the PUCCH region is not configured.

1.1 PUCCH Region Configuration for an MTC Device Located in Coverage Enhancement Region As explained above, as for the MTC device located in the coverage enhancement (CE) region, different repetition levels may be configured for each channel. In this case, if uplink physical channel is transmitted with different repetition levels, then its reception power at an eNB may be different from each other. Specifically, the channel such as PUCCH is received at the eNB in the CDM manner, and in this case, the eNB may not be able to distinguish a plurality of channels in some implementations when a difference in received power among a plurality of channels is large. This may lead to deterioration of PUCCH detection performance Therefore, it may consider a method in which CDM is performed only for channels having similar power levels. In this case, it may be considered to classify the PUCCH region by repetition level or repetition level set. In this case, classifying the PUCCH region may be understood as having a different PUCCH region among channels which have different repetition levels through FDM/TDM or the like. For example, it may consider further configuring a PUCCH region in order of repetition level subsequent to the PUCCH region for an existing normal UE.

More specifically, the PUCCH configuration may be performed independently for each repetition level. More specifically, it will be described with reference to FIG. 11.

Figure 11:
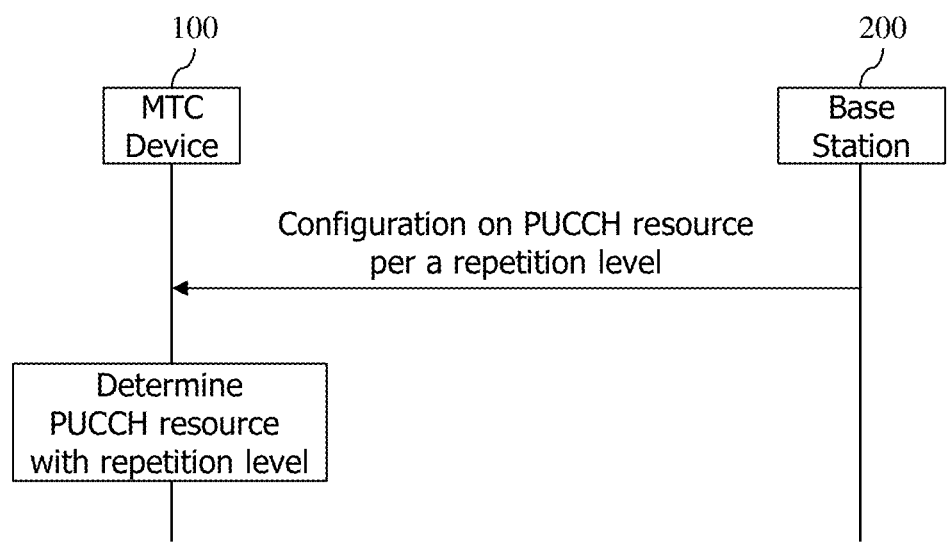
FIG. 11 illustrates an example of signaling a configuration for the PUCCH region with its repetition level of PUCCH.

FIG. 11 Illustrates an Example of Signaling a Configuration for the PUCCH Region with its Repetition Level of PUCCH.

As may be seen with reference to FIG. 11, the BS may signal to the MTC device a configuration on the PUCCH resource per a repletion level of PUCCH.

Then, the MTC device determines the repetition level of the PUCCH and determines the number of repeated transmission of the PUCCH based on the repetition level.

Then, the MTC device determines a PUCCH resource corresponding to the repetition level based on the configuration. Further, the MTC device transmits the PUCCH by the repetition times on the determined resources.

The PUCCH configuration may refer to include cell-specific configured values. For example, the PUCCH configuration may include deltaPUCC-shift, which affects to specify the number that can be distinguished by cyclic shift, n1PUCCH-AN nCS-AN, which can be used to specify a start position of PUCCH resource including HARQ-ACK, nRB-CQI indicating the number of PRBs per slot that PUCCH resources including CSI can be included, or the like. In this case, each PUCCH region may represent information of PUCCH resource and PUCCH narrowband information as parameters.

Meanwhile, the MTC device located in the coverage extension (CE) region may consider applying the frequency hopping in a unit of slot again as a part of reducing the number of PUCCH repetitions. In this case, the MTC device located in the coverage extension (CE) region may consider performing frequency hopping in units of a plurality of subframes or a plurality of slots instead of the slot unit as a part to enhance the radio channel estimation performance.

Figure 12A:
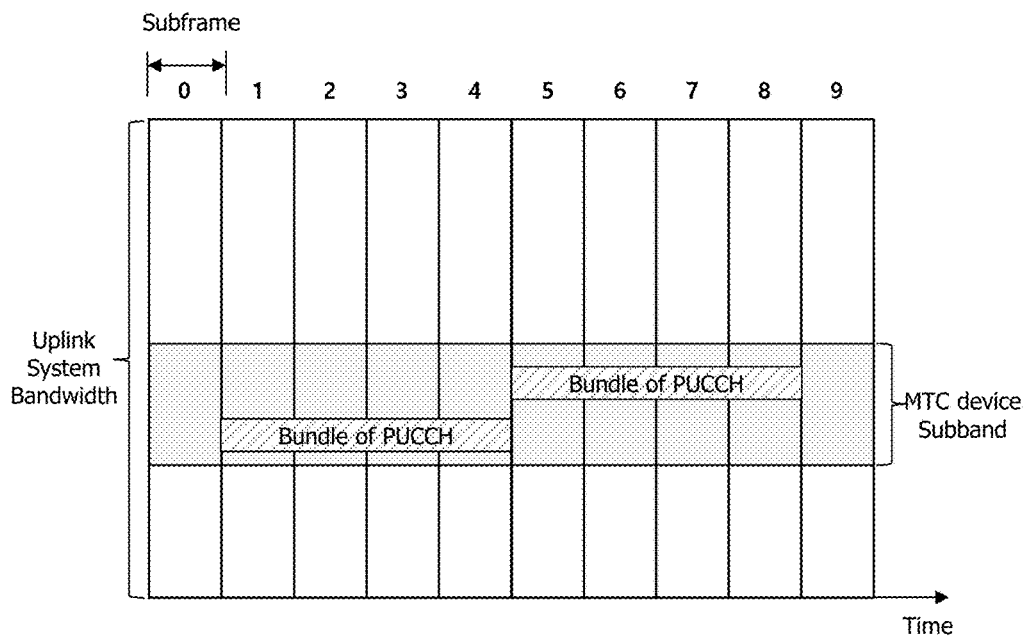
FIG. 12A and FIG. 12B illustrates an example in which a frequency hoppling is applied when the PUCCH is repeatedly transmitted.
Figure 12B:
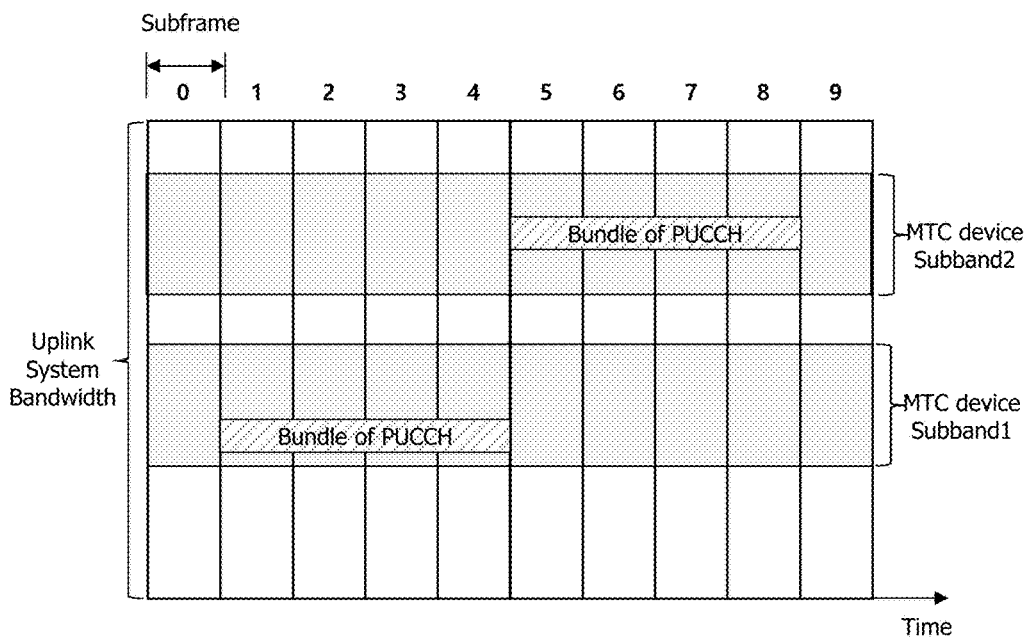

FIG. 12A and FIG. 12B Illustrates an Example in which a Frequency Hoppling is Applied when the PUCCH is Repeatedly Transmitted.

As may be seen with reference to FIG. 12A, when the MTC device performs N (e.g. 8) repetitions on the PUCCH, it may be considered that for the first N/2 subframes (e.g. 1 to 4 subframe shown), the PUCCH are transmitted over a region in which a frequency index in the bandwidth of the MTC device is low (high), while for the next N/2 subframes (e.g. 5 to 8 subframe shown), the PUCCH are transmitted over a region in which a frequency index in the subband for the MTC device is high (low). As another alternative, for the purpose of ensuring continuous allocation of RBs to the PUSCH of a legacy general UE or other MTC devices, it is assumed that the number of subframes in which the repetition of each PUCCH is transmitted in the two frequency regions is made different from each other. As an example, when N is the number with which the PUCCH is repeatedly transmitted, let's assume N=N1+N2. In this case, it is assumed that N1>N2. It may be assumed to differently configure a frequency region in which the repetition of PUCCH is transmitted on the N1 subframes with a frequency region in which the repetition of PUCCH is transmitted on the next N2 subframes. In this case, N1 and N2 may be a predetermined value or a value configured in a high layer. Meanwhile, the frequency hopping of the PUCCH may be performed once during the PUCCH is repeated N times, or may be performed a plurality of times. An example of performing the frequency hopping a plurality of times may be to transmit the repetition of the PUCCH through different frequency regions based on Nstep configured in advance or by a higher layer signal.

As may be seen with reference to FIG. 12B, when the MTC device performs N (e.g., 8) times of repetitions of the PUCCH, it may be considered that on the first N/2 subframe (e.g., 1 to 4 subframes shown), the PUCCH is transmitted on a subframe 1 for the MTC device, while on the next N/2 subframe (e.g., 5 to 8 subframes shown), the PUCCH is transmitted on a subframe 2.

Alternatively, although not shown, if the MTC device repeatedly transmits a first PUCCH on N subframes and repeatedly transmits a second PUCCH on M subframes, then the first PUCCH may be transmitted on the subband 1 for the MTC device on the N subframe and the second PUCCH may be transmitted may be transmitted on the subband 2 for the MTC device on the M subframe II. PUCCH Resource Mapping The downlink sub-band and the uplink sub-band of the MTC device may be configured to be paired with each other, or may be configured independently of each other. As an example, in a situation where the amount of downlink traffic is smaller than the amount of uplink traffic, a case may be considered where a plurality of MTC devices share one downlink subband but different uplink subbands may be configured differently from each other. In this case, if (E)CCE indexes are specified differently from among a plurality of MTC devices, the PUCCH resources are distinguished, and thus the efficiency of using PUCCH resources may be degraded. For example, let's assume that the same downlink subband is allocated to MTC device 1 and MTC device 2, and the uplink subbands are allocated differently from each other. Further, let's assume that ECCE1 is allocated to the MTC device 1 and ECCE2 is allocated to the MTC device 2 in the same downlink subband. Then, the PUCCH resource 1 is allocated to the MTC device 1, and the PUCCH resource 2 is allocated to the MTC device 2. However, since the uplink sub-bands are different between the MTC device 1 and the MTC device 2, the PUCCH resources may not necessarily be specified differently from each other. That is, it may be better to allocate PUCCH resource 1 to ECCE2 in some cases by using ARO or the like in order to completely fill the PUCCH resources in any one uplink sub-band. On the other hand, it may be considered for a plurality of MTC devices to be allocated to the same uplink subbands, but differently allocated to downlink subbands. In this case, when the MTC devices perform the PUCCH resource mapping, the downlink subband regions are different from each other, but the uplink subbands are the same, and thus the problem may be occurred in that the PUCCH resources may become the same. It will be described with reference to FIG. 13.

Figure 13:
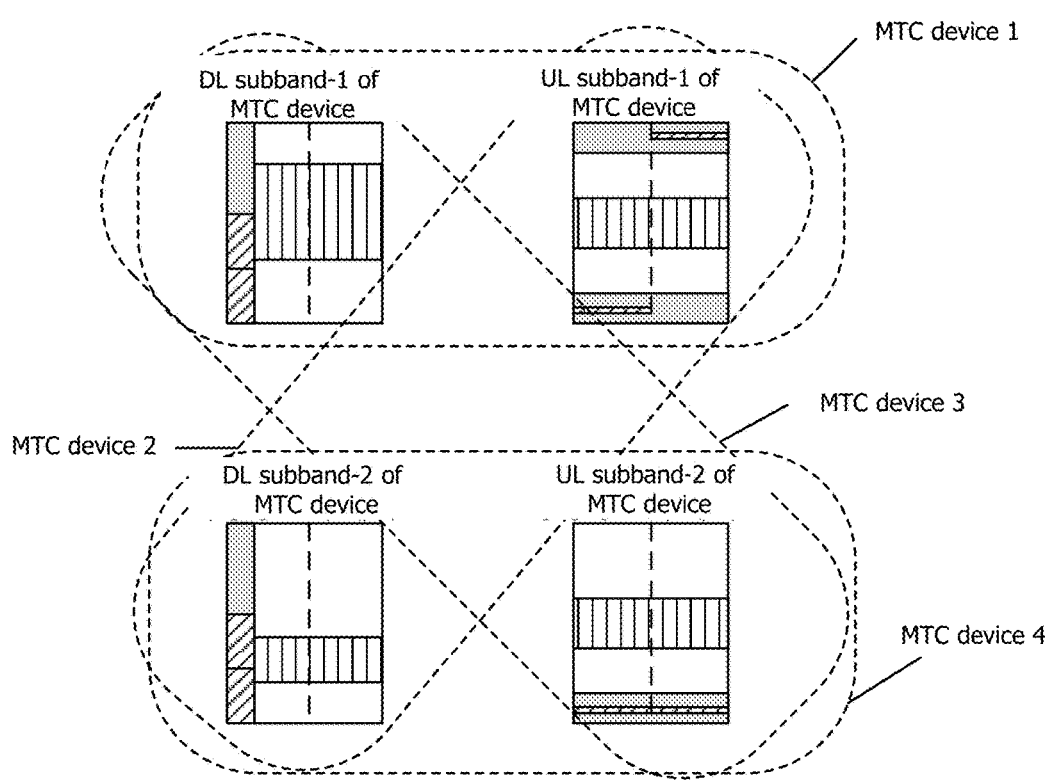
FIG. 13 is an exemplary diagram illustrating a situation where the uplink subband or the downlink subband is the same among a plurality of MTC devices.

FIG. 13 is an Exemplary Diagram Illustrating a Situation Where the Uplink Subband or the Downlink Subband is the Same Among a Plurality of MTC Devices.

Referring to FIG. 13, it may be configured that for MTC device 1, downlink subband 1 and uplink subband 1 are configured to be paired with, and for MTC device 2, downlink subband 2 and uplink subband 1 are paired with, and for the MTC device 3, the downlink subband 1 and the uplink subband 2 are configured to be paired with, and for the MTC device 4, the downlink subband 1 and the uplink subband 2 are configured to be paired with. In this case, the uplink subband or the downlink subband of the MTC device may be designated by an RRC signal or through DCI or the like.

In the example illustrated in FIG. 13, in the MTC device 1 and the MTC device 2, the downlink subbands are allocated differently from each other, but the same uplink subbands are allocated to each other, and thus the problem may be occurred in that the PUCCH resources may become the same resource.

As an method to solve the problem, when the BS allocates the same downlink subbands to an arbitrary MTC device, it may be considered that a pair of downlink subbands and uplink subbands is designated so that the uplink subbands can be equally allocated, and signaling the designation to the MTC device. However, in the case where this is not available or in a case where the pair of the downlink sub-band and the uplink sub-band are not specified but are configured independently of each other in order to efficiently manage the system bandwidth, it may be required to consider that a method for efficiently performing the PUCCH resource allocation, or a method for solving the PUCCH resource collision problem occurred from which the same CCE index have been used.

Therefore, the following methods are presented in this section

As a first alternative, for a plurality of MTC devices, if there is a plurality of DL downlink subbands paired with the corresponding uplink subband, then the BS does not use the PDCCH. Instead, the BS performs downlink scheduling through an EPDCCH. The BS may prevent the PUCCH resources from colliding with each other when the MTC devices perform the PUCCH resource mapping through the ARO (ACK/NACK Resource Offset) of the EPDCCH or the like. The range of ARO values included in the EPDCCH may be extended to increase the flexibility in PUCCH resource selection. This method may be applied only when the uplink subband and the downlink sub-band of the MTC device are not paired with one-to-one.

As a second alternative, the BS may consider transmitting to include an ARO (ACK/NACK Resource Offset) within the PDCCH. This ARO may be used together with the CCE and higher layer signals when the MTC device determines the PUCCH resource. In a situation where one uplink sub-band is mapped to a plurality of downlink sub-bands, the BS adjusts the value of the corresponding ARO and thus the PUCCH resource collision may be prevented from each other, even in the case of the same CCE value among the plurality of downlink subbands. Further, in a situation where one downlink subband is mapped to a plurality of uplink subbands, the method makes it more flexible for a plurality of MTC devices to use the PUCCH resource utilization in their respective uplink subbands, even in the case that a plurality of MTC devices uses different CCE values for the one downlink sub-band. Meanwhile, the method may be performed only for a plurality of downlink subbands mapped to the corresponding uplink subbands. Alternatively, the BS may determine whether the method is applied or not, and then inform the BS of whether the method has been applied to through a higher layer signaling.

As a third alternative, an MTC device using some subbands other than the entire system bandwidth may determine the PUCCH resource by further considering UEID (e.g., UE-RNTI). This method may be performed only in a plurality of downlink subbands mapped to the corresponding uplink subbands. Alternatively, the BS may determine whether the method is applied or not, and then inform the BS of whether the method has been applied to through a higher layer signaling.

As a fourth alternative, an MTC device using some subbands other than the entire system bandwidth may determine the PUCCH resource by further considering information on the downlink subbands/uplink subbands. More specifically, the downlink sub-band may be a region in which the (E) PDCCH is transmitted in the USS (UE-specific Search Space) or a region in which the PDSCH is transmitted. For example, if the index of the downlink subbands/uplink subbands is given based on the entire system bandwidth, then the MTC device may use the corresponding indexes in determining the PUCCH resources. The method may be performed only in a plurality of downlink subbands mapped to the corresponding uplink subbands. Alternatively, the BS may determine whether the method is applied or not, and then inform the BS of whether the method has been applied to through a higher layer signaling.

Meanwhile, an indication field such as ARO may be newly added for the MTC device, or the existing TPC field may be reused. Reuse of the TPC field can be performed only when the MTC device does not perform a closed loop power control operation using the TPC field. The determination of the PUCCH resource may refer to being divided through cyclic shift and orthogonal cover code (OCC) within the same PRB, or it may be indicative of another PRB.

The above mentioned alternatives may be also applied to when a MTC device located in the coverage enhancement region performs the repetitive transmission of the uplink channel or the downlink channel.

II-2. PUCCH Resource Mapping of a MTC Device Located in the Coverage Enhancement Region Meanwhile, the MTC device located in the coverage extension region may repeatedly transmit the (E) PDCCH on a plurality of subframes. In this case, the value for (E)CCE in the (E) PDCCH transmitted on each subframe may also be changed. The (E)CCE value changing for each of the subframe may be changed to a predetermined pattern to reduce the burden of blind decoding. In this case, if the repetition levels of the physical channels are different from each other, then the end points of the physical channels may be different from each other, though the starting point (subframe start position) of the physical channels is the same. On the other hand, the end points of the physical channels are the same, but the starting points of the physical channels may be different from each other. If the subframe in which a first PDCCH of a first repetition level is started to be transmitted and the subframe in which in which a second PDCCH of a second repetition level is started to be transmitted are different, but if the CCEs in the transmission start subframes are the same, PUCCH resources are determined based on the same CCE, and thus collisions may occur with each other. In order to prevent the problem, when the (E)PDCCH is repeatedly transmitted, the PUCCH resource may be determined based on the (E)CCE of the last transmitted subframe of the (E)PDCCH transmission. Separately or additionally, it may be considered to introduce a third parameter for determining the PUCCH resource, and the following is a more specific example of the corresponding case.

As a first alternative, for an MTC device located in coverage extension coverage enhancement (CE), the BS may not use the PDCCH. Instead, the BS performs downlink scheduling through an EPDCCH. The BS may prevent the PUCCH resources from colliding with each other when the MTC devices perform the PUCCH resource mapping through the ARO (ACK/NACK Resource Offset) of the EPDCCH. The range of ARO values included in the EPDCCH may be extended to increase the flexibility in the PUCCH resource selection.

As a second alternative, the BS may consider transmitting an ARO (ACK/NACK Resource Offset) within the PDCCH. This ARO may be used together with the CCE and higher layer signals when the MTC device determines the PUCCH resource. The BS may prevent the PUCCH resources from colliding by adjusting the value of the corresponding ARO, even though the initial CCE values are the same among the channels having different repeat levels. The BS may inform the MTC device of whether the method has been applied or not through a higher layer signal.

As a third alternative, the MTC device located in the coverage extension area may determine the PUCCH resource by further considering the UE ID (e.g., UE-RNTI). The BS may inform the MTC device of whether the method has been applied or not through a higher layer signal.

As a fourth alternative, the MTC device located in the coverage extension area may determine the PUCCH resource by further considering the information on the repetition level. The BS may inform the MTC device of whether the method has been applied or not through a higher layer signal.

As a fifth alternative, the MTC device located in the coverage extension area may determine the PUCCH resource by further considering the start time or the end time of the (E) PDCCH transmission. The start/end time may be represented by a subframe index type or an SC-FDMA symbol index or a slot index.

Some or all of the alternatives may be combined. As one example, the MTC device may determine the PUCCH resource by further considering the repetition level with the ARO. The indication field, such as the ARO, may be newly added to the PDCCH for the MTC device, or may reuse the existing TPC field. Reuse of the TPC field can be performed only when the MTC device does not perform a closed loop power control operation using the TPC field. The determination of the PUCCH resource may refer to being divided through cyclic shift and orthogonal cover code (OCC) within the same PRB, or it may be indicative of another PRB. As a more specific example, the BS may configure the downlink subband to be used with which the MTC device determines the PUCCH resource or the location of the RB to which the PUCCH is to be transmitted. The MTC device may determine a region to transmit the PUCCH including the HARQ-ACK according to the downlink subband for performing the USS monitoring or the downlink subband on which the PDSCH is received.

The above mentioned embodiments of the present invention may be implemented by various means. For example, embodiments of the present invention may be implemented by hardware, firmware, software, or combinations thereof. Specifically, embodiments of the present invention will be explained by referring to the following diagram.

Figure 14:
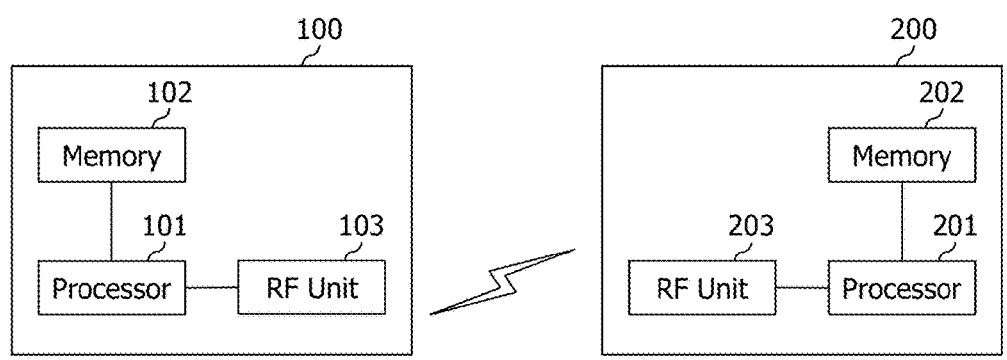
FIG. 14 is a block diagram illustrating a wireless communications system in which the disclosure of the present specification is implemented.

FIG. 14 is a Block Diagram Illustrating a Wireless Communications System in which the Disclosure of the Present Specification is Implemented.

A BS 200 includes a processor 201, a memory 202 and an RF (radio frequency) unit 203. The memory 202 is connected to the processor 201, and stores various information for driving the processor 201. The RF unit 203 is connected to the processor 201, and transmits and/or receives radio signals. The processor 201 implements proposed functions, processes and/or methods. In the above mentioned embodiment, the operation of the BS 50 can be implemented by the processor 201.

A MTC device 100 includes a processor 101, a memory 102 and an RF unit 103. The memory 102 is connected to the processor 61, and stores various information for driving the processor 101. The RF unit 103 is connected to the processor 101, and transmits and/or receives radio signals. The processor 101 implements proposed functions, processes and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a physical uplink control channel (PUCCH), the method performed by a wireless device and comprising:
    transmitting repetitions of the PUCCH on a plurality of subframes; and
    performing a frequency hopping for the PUCCH while transmitting the repetitions of the PUCCH,
    wherein a location of a frequency region on which the PUCCH is transmitted is maintained during n subframes among the plurality of subframes, and
    wherein the location of the frequency region on which the PUCCH is transmitted is not hopped per a slot in a subframe.

2. The method of claim 1, wherein the location of the frequency region on which the PUCCH is transmitted is located on a subband within an uplink system bandwidth.

3. The method of claim 2, wherein the frequency hopping is performed within the subband or in a unit of the subband.

4. The method of claim 1, further comprising:
    determining a number of the repetitions of the PUCCH according to a repetition level.

5. The method of claim 1, wherein the repeated transmissions of the PUCCH are performed if the wireless device is located in a coverage enhancement region of a cell.

6. The method of claim 1, further comprising:
    receiving a configuration for a PUCCH resource,
    wherein the configuration for the PUCCH resource is specified according a repetition level of the PUCCH; and
    determining a corresponding PUCCH resource based on the configuration.

7. The method of claim 6, wherein the configuration for the PUCCH resource includes cell-specific values.

8. The method of claim 7, wherein the cell-specific values include at least one of:
    a parameter for specifying a number of the PUCCHs distinguishable by a cyclic shift, a parameter for specifying a start location of the PUCCH resource including a hybrid automatic repeat request-acknowledgement (HARQ-ACK) and a parameter for specifying the number of physical resource blocks (PRBs) per a slot on which the PUCCH resource including a channel state information (CSI).

9. A wireless device for transmitting a physical uplink control channel (PUCCH), comprising:
    a transceiver; and
    a processor operatively connected to the transceiver and configured to:
    transmit repetitions of the PUCCH on a plurality of subframes; and
    perform a frequency hopping for the PUCCH while transmitting the repetitions of the PUCCH,
    wherein a location of a frequency region on which the PUCCH is transmitted is maintained during n subframes among the plurality of subframes, and
    wherein the location of the frequency region on which the PUCCH is transmitted is not hopped per a slot in a subframe.

10. The wireless device of claim 9, wherein the location of the frequency region on which the PUCCH is transmitted is located on a subband within an uplink system bandwidth.

11. The wireless device of claim 10, wherein the frequency hopping is performed within the subband or in a unit of the subband.

12. The wireless device of claim 9, wherein the processor is further configured to:
    determine a number of the repetitions of the PUCCH according to a repetition level.

13. The wireless device of claim 9, wherein the repeated transmissions of the PUCCH are performed if the wireless device is located in a coverage enhancement region of a cell.

* * * * *